United States Patent [19]

Sato et al.

[11] Patent Number: 4,752,492

[45] Date of Patent: Jun. 21, 1988

[54] PROCESS FOR EFFECTING GELATION OF FISH MEAT MATERIAL

[75] Inventors: Kiyoe Sato, Ushiku; Hisashi Nozaki, Shiki, both of Japan

[73] Assignee: Kabushikikaisha Kibun, Tokyo, Japan

[21] Appl. No.: 870,133

[22] Filed: Jun. 3, 1986

[51] Int. Cl.$^4$ .................. A23L 1/325; A23P 1/00
[52] U.S. Cl. ..................................... 426/513; 426/643
[58] Field of Search ..................... 426/512, 513, 643

[56] References Cited

U.S. PATENT DOCUMENTS

| | | | |
|---|---|---|---|
| 2,255,796 | 9/1941 | Linane et al. | 426/513 |
| 3,940,217 | 2/1976 | McCarthy et al. | 426/513 |
| 3,956,516 | 5/1976 | Holt et al. | 426/513 |
| 4,273,789 | 6/1981 | Zimmerman | 426/513 |

FOREIGN PATENT DOCUMENTS

| | | | |
|---|---|---|---|
| 59-192039 | 10/1984 | Japan | 426/643 |
| 284755 | 1/1971 | U.S.S.R. | 426/513 |

*Primary Examiner*—George Yeung
*Attorney, Agent, or Firm*—Browdy and Neimark

[57] ABSTRACT

A fish meat material can undergo gelation by applying pressure thereto without adding any salts such as common salt.

2 Claims, 1 Drawing Sheet

PROCESS FOR EFFECTING GELATION OF FISH MEAT MATERIAL

FIELD OF THE INVENTION

This invention relates to a process for effecting gelation of a fish meat material as such by applying pressure thereto.

BACKGROUND OF THE INVENTION

Fish meat materials include various fish meats such as slices and fillets and ground fish meat which is prepared by treating fishes such as Alaska pollack, shark or croaker, removing bones from the meat and leaching the meat thus obtained with water to thereby remove water-soluble proteins therefrom.

Conventionally the gelation of ground fish meat is effected by adding 2 to 3% of salts such as common salt thereto without fail, thoroughly grinding the same and removing salt-soluble proteins therefrom to give a homogeneous sol followed by molding and heating.

SUMMARY OF THE INVENTION

We have conducted studies based on an idea that gelation of fish meat materials without adding any salts may bring about wider applications thereof to various food products and consequently found that gelation of a fish meat material can be readily effected by simply applying pressure thereto without adding common salt.

The present invention have been completed based on this finding and provides a process for effecting gelation of a fish meat material by applying pressure thereto.

DETAILED DESCRIPTION OF THE INVENTION

Figure 1:
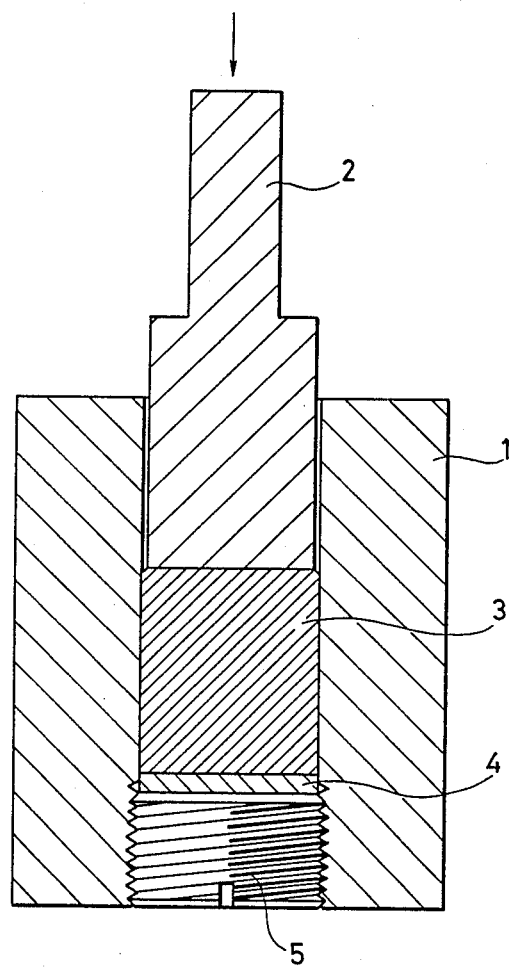
FIG. 1 is a longitudinal sectional view of a press used in the present invention, wherein 1 is a cylinder, 2 is a plunger, 3 is a ground fish meat gel, 4 is a die and 5 is a die holder.

Since the process for effecting gelation of a fish meat material according to the present invention merely comprises applying pressure to the ground fish meat material, common salt for seasoning is added thereto only in a very small amount, if any. Further a fish meat material can undergo gelation without any seasoning according to the process of the present invention, this process is highly useful in preparing salt-free or low-salt fish meat gel materials.

Fish meat gels prepared by the process of the present invention are highly useful food materials. A finely ground gel may be used as such or in the form of a mixture with minced meat in preparing hamburger. Further finely cut pieces of the same may be formed into a crab leg-like product which may be used in preparing salad.

The fish meat material optionally seasoned is introduced into a press wherein pressure is applied thereto to cause the same to gel.

Any press may be employed. An example thereof is a simple press as shown in FIG. 1, wherein 1 is a cylinder, 2 is a plunger, 3 is a squeezed fish meat material. It is desirable that the cylinder is heated with an appropriate heating means.

The fish meat material is packed into the cylinder 1 of the press about four-fifths full and pressure such as hydraulic or oil pressure is applied thereto by the plunger 2 to thereby squeeze the fish meat material. The gel fish meat material, which forms a lump at the bottom, may be readily taken out by removing the die holder 5 and the die 4. The gel formation slightly varies depending on the temperature of the ground fish meat material and the pressure to be applied thereto during this process. It is possible to effect gelation of the ground fish material at a material temperature of 5° C. or above. A lower temperature would result in a decrease in the gel strength so that a gel is obtained by applying a pressure of 30 $kg/cm^2$ or higher when the temperature of the material is 25° C. or below.

Application of a pressure of 5 $kg/cm^2$ or above for five min at a material temperature of approximately 35° C. would result in a high-strength gel which is almost the same as those of conventional kamaboko products.

Furthermore, application of a pressure of 5 to 100 $kg/cm^2$ for five min at a material temperature of 40° to 75° C. would result in a gel which is harder than conventional kamaboko products. The gel thus obtained, which is significantly hard but exhibits an excellent texture, is highly available as a novel material for salad when cut into an appropriate size.

The condition of gelation according to the present invention varies depending on the temperature of the ground fish meat material, pressure and the period of applying pressure. Thus each factor bringing about the aimed gel strength may be previously determined by a preliminary test and the gelation may be carried out under the predetermined condition thereafter.

In the process of the present invention, it is desirable to effect gelation of the ground fish meat material by applying a pressure of 2 $kg/cm^2$ or above, preferably 50 $kg/cm^2$ or above, thereto at a material temperature of 5° C. or above, preferably approximately 30° to 50° C., for 10 to 20 sec, preferably three to eight min.

To further illustrate the present invention, the following Test Example and Examples will be given.

TEST EXAMPLE gelling device: Shimadzu Flow Tester CFT-500 (cylinder; 1 $cm^2 \times 20$ mm) and
ground fish meat: ground Alaska pollack meat (moisture content; 78%).

The Alaska pollack meat was packed into the above gelling device by portions to give a height of 17 mm in the cylinder, heated to give a material temperature of 10° to 90° C. and applied a pressure of 0 to 200 $kg/cm^2$ for five min. Then each gel material was taken out the cylinder to determine the extent of gelation.

The following table shows the eatent of gelation of each sample.

| Press. | Extent of gelation Temp. | | | | | | | | | | | | |
| --- | --- | --- | --- | --- | --- | --- | --- | --- | --- | --- | --- | --- | --- |
| | 10° C. | 20° C. | 25° C. | 30° C. | 35° C. | 40° C. | 45° C. | 50° C. | 55° C. | 60° C. | 70° C. | 80° C. | 90° C. |
| 0 $kg/cm^2$ | X | X | X | X | X | X | X | X | ∆ | ∆ | ○ | ○ | ○ |
| 10 | X | X | ∆ | ○ | ⊙ | ○ | ○ | ○ | ○ | ○ | ○ | ○ | ○ |

-continued

| Press. | Extent of gelation Temp. | | | | | | | | | | | | |
|---|---|---|---|---|---|---|---|---|---|---|---|---|
| | 10° C. | 20° C. | 25° C. | 30° C. | 35° C. | 40° C. | 45° C. | 50° C. | 55° C. | 60° C. | 70° C. | 80° C. | 90° C. |
| 30 | X | X | Δ | O | O | O | O | O | O | O | O | O | O |
| 50 | O | O | O | O | O | O | O | O | O | O | O | O | O |
| 100 | O | O | O | O | O | O | O | O | O | O | O | O | O |
| 150 | O | O | O | O | O | O | O | O | O | O | O | O | O |
| 200 | O | O | O | O | O | O | O | O | O | O | O | O | O |

X: no gelation
Δ: light gelation
O: gelation

EXAMPLE 1

Ground Alaska pollack meat was packed into the same gelling device as used in Test Example at a cylinder temperature of 30° C. to give a height of 17 mm in the cylinder and pressure (50 kg/cm$^2$) was applied thereto for five min. Then the plunger was removed and the gel thus formed was taken out. Thus a ground fish meat gel which was somewhat softer than kamaboko products was obtained.

The ground fish meat gel was further ground with a grinder to give fine pieces which were suitable for mixing with minced meat in preparing hamburger.

EXAMPLE 2

Ground Alaska pollack meat was packed into the same gelling device as used in Test Example at a cylinder temperature of 50° C. to give a height of 17 mm in the cylinder (diameter: 11 mm) and pressure (50 kg/cm$^2$) was applied thereto for five min. Then the plunger was removed and the gel thus formed was taken out. Thus a ground fish meat gel which was somewhat harder than kamaboko products was obtained.

The ground fish meat gel was cut into sticks (2×2×13 mm) which had excellent texture and taste when dressed with mayonnaise.

What is claimed is:

1. A process for effecting gelation of fish meat material comprising applying to said fish meat material a pressure of at least 35 kg/cm$^2$ at a temperature of from +5° C. to +25° C. to cause said fish meat material to gel.

2. A process for effecting gelation of fish meat material comprising applying to said fish meat material a pressure of at least 10 kg/cm$^2$ at a temperature of from +26° C. to +69° C. to cause said fish meat material to gel.

* * * * *